UNITED STATES PATENT OFFICE.

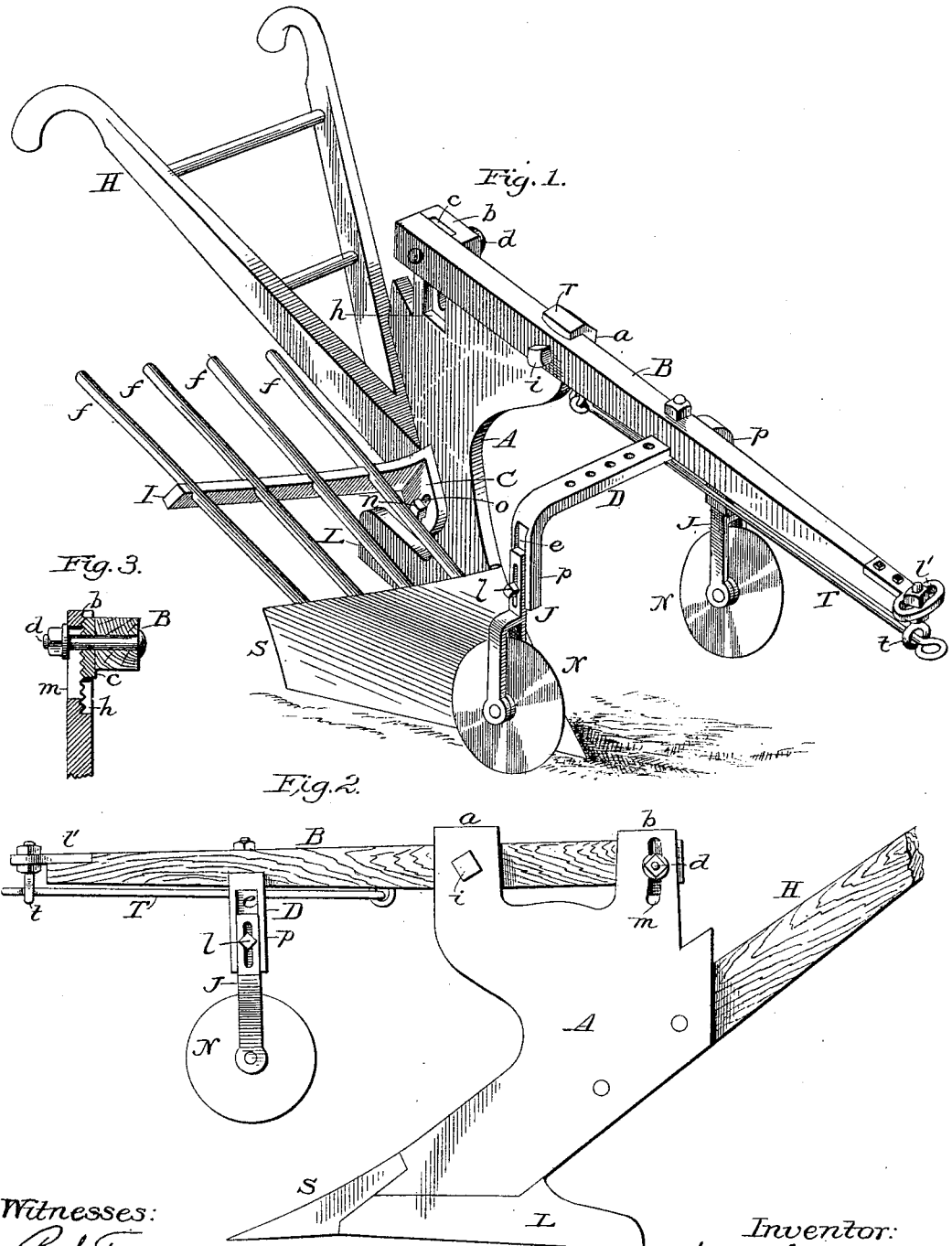

WILLIAM T. GARRETT, OF JOHNSONTOWN, VIRGINIA.

POTATO-DIGGER.

SPECIFICATION forming part of Letters Patent No. 350,733, dated October 12, 1886.

Application filed May 26, 1886. Serial No. 203,303. (No model.)

*To all whom it may concern:*

Be it known that I, WILLIAM T. GARRETT, of Johnsontown, in the county of Northampton and State of Virginia, have invented certain new and useful Improvements in Potato-Diggers, of which the following is a specification.

This invention relates to that class of implements known as "potato-diggers;" and the invention consists in certain features or improvements hereinafter more fully specified.

Figure 1 is a perspective view, Fig. 2 a side elevation, and Fig. 3 a sectional view of a portion detached.

I construct my improved potato-digger in the general form of a plow having a standard, A, landside L, and share S, as shown in Figs. 1 and 2, the handles H being bolted to the standard A, as shown in Fig. 1. Instead of the usual mold-board, I provide a screen composed of a series of rods, $f$, as shown in Fig. 1, these rods at their lower ends being secured in any suitable manner to the rear or upper edge of the share S, and being supported on and held in place by a bar, I, which at its inner end is provided with an angular flange, C, by which it is bolted to the standard A, as clearly shown in Fig. 1. The flange C is provided with a slot, $o$, as shown, so that by loosening the bolt $n$, which secures the bar I to the standard A, the bar can be raised or lowered, and thus change the angle or inclination of the screen or rods $f$, as may be desired, thereby adapting it to the varying conditions of soil, &c., under which the implement is or may be used.

As shown more clearly in Fig. 2, the standard A is widened at top, and is provided with two arms or projections, $a$ and $b$, for the attachment and adjustment of the beam B. The front arm, $a$, is provided with an inwardly-projecting lug or flange, $r$, against the under side of which the top of the beam engages, as shown in Fig. 1, a bolt, $i$, serving to hold the beam in place at that point to serve as a pivot on which it turns slightly when adjusted, the upward strain being taken mainly by the flange $r$. The rear arm or projection, $b$, has a vertical recess formed on its inner face, as shown in Fig. 1, this recess $h$ being of a depth and width corresponding to a metal plate, $c$, which fits therein, and is secured to the side of the beam in any suitable manner, so as to move with the beam, its outer face next to the arm being serrated to correspond with serrations made in the back wall of the recess in said arm $b$, as shown in section in Fig. 3, so that when the bolt $d$, which passes through a slot, $m$, in the arm $b$, as shown in Fig. 2, and through the block $c$ and beam B, when tightened up, will cause the serrated surfaces to interlock, and thus prevent the parts from slipping one upon the other. By loosening the bolt $d$ the beam can be adjusted vertically as desired. A draft-rod, T, is secured to the under side of the beam just in front of the standard A, and is held at its front end by an eyebolt, $t$, which is held by nuts in a slotted plate, $l'$, secured to the front end of the beam, as shown in Figs. 1 and 2, and by means of which the rod can be adjusted to the right or left, as may be desired. To the beam, at a proper distance in front of the standard A, I secure a cross-bar, D, which is provided with a series of holes or a slot, as may be preferred, by which it can be adjusted laterally on the beam. At each end this bar D is provided with a pendent arm, $p$, in the outer face of which I form a vertical recess, $e$, as shown clearly in Figs. 1 and 2. I then provide two roller-colters, N, and mount each separately in a bifurcated holder, J, the upper portion of which is made to fit in the recess $e$, and is slotted, so it can be adjusted up or down and be held in place by a bolt, $l$, as shown in Figs. 1 and 2, and so that either one may be detached at pleasure, and permit the remaining one to be used alone. The object of these two colters is to cut the vines and weeds at each side, and when both are used the bar or yoke D will be so adjusted as to bring the colter on the left-hand side in line with or a little to one side of the standard A, so as to cut through and sever the vines and weeds in front of the standard, so that as the share raises the earth the vines, &c., will separate and be turned over and covered by the earth as the implement advances.

The two colters are more especially for use in digging sweet potatoes, the vines of which, as is well known, spread out over the surface of the ground.

By making the screen adjustable its inclination can be so varied as to cause the potatoes to pass off at the side, or by lowering its rear end they can be made to pass off at the rear, sometimes one and sometimes the other plan being preferred, according to circumstances. By providing for the adjustment of the beam the draft-rod, the colters, and the screen, as described, the implement is adapted for use under all the varying conditions of soil and crop, and it can be used for digging both sweet and Irish potatoes with equal facility. It can also be used for lifting, stirring, and loosening the soil between the rows of growing plants of any kind, the colters in such case being removed.

Having thus described my invention, what I claim is—

1. In combination with the standard A and share S, the adjustable screen consisting of the backwardly-inclined rods f, having their front ends secured to the share S, and their rear portion supported on the adjustable bar I for changing the inclination of the screen, substantially as set forth.

2. In combination with the beam B, the yoke D, adapted to carry a rolling-colter at each side, substantially as shown and described.

3. In combination with the beam B, the laterally-adjustable yoke D, having at each end a pendent arm, p, adapted to receive and hold the colter supports or holders J, substantially as and for the purpose set forth.

4. In combination with a plow or similar implement, the two colters N, each being arranged to be adjusted vertically independent of the other, substantially as set forth.

WILLIAM T. GARRETT.

Witnesses:
 THOS. C. WALSTON,
 L. J. GOFFIGON.